May 3, 1949.　　　F. J. TRAINOR　　　2,468,848
SNAP ACTION COUPLING DEVICE
Filed July 14, 1947
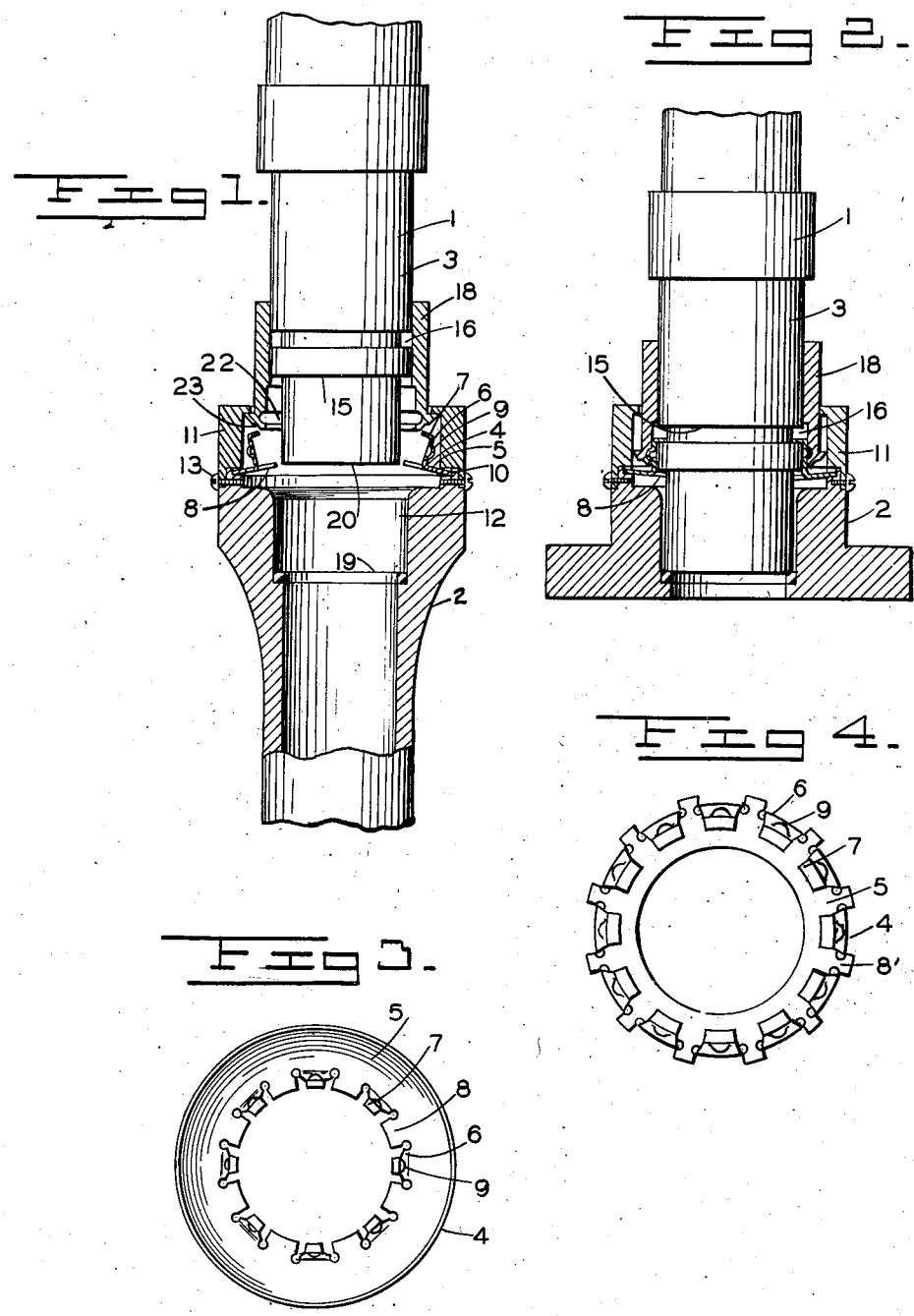
INVENTOR.
FOSTER J. TRAINOR
BY
Henry Heyman
ATTORNEY Patented May 3, 1949

2,468,848

UNITED STATES PATENT OFFICE 2,468,848

SNAP ACTION COUPLING DEVICE

Foster J. Trainor, Holly Hill, Fla., assignor to Disto Corporation, Holly Hill, Fla.

Application July 14, 1947, Serial No. 760,761

10 Claims. (Cl. 285—174)

This application is a continuation-in-part of application Serial Number 748,291, filed by me on May 15, 1947, and Serial Number 755,034, filed by me on June 17, 1947, and is directed to certain improvements and modifications in snap action coupling devices such as shown therein.

A desirable characteristic in any detachable coupling device is simplicity and ease in its use. I have herein provided a construction in which a snap action gripping element is housed in one of the coupling elements and is so shielded in the open condition that it cannot be unintentionally closed in the absence of the insertion of the plug member.

Another characteristic in a detachable coupler which is desirable for some purposes, is the requirement of less force in coupling the elements than is required to separate them.

According to my invention, I provide a novel form of gripping element in a novel socket and plug combination. My gripping element is in the form of an open center convex disc of resilient material having two conditions of stability which are convex configurations on either side of a plane passing through the outer periphery thereof. This disc has gripping fingers with inturned prongs arranged on the inner or outer periphery thereof so that when the disc is convex in one direction the fingers and prongs are drawn inward and axially toward the disc, and when the disc is convex in the other direction the fingers open or spread apart. Since the disc is of resilient material it has the characteristic of resisting change in its convex form until dead center is reached, and from that point it snaps into the second convex form.

Other features and advantages of my invention will appear from the following detailed description of species thereof and from the drawing.

In the drawing:

Fig. 1 is a section through one form of socket and plug in detached condition;

Fig. 2 is a cross sectional view of the socket and plug in engaged condition;

Fig. 3 is a plan view of one form of snap-action-gripping device in closed condition; and Fig. 4 shows a modified form of snap-action-gripping device in closed condition.

Referring to the drawing, a coupler for hoses, electric cables and the like is shown in Figs. 1 and 2, and comprises generally a plug member 1 and a socket member 2. The socket houses the outer peripheral portion of the snap action gripping device indicated generally at 4 in a groove 10. Plug member 1 when urged toward the socket member 2 causes the fingers 6 and prongs 7 of the snap-action device to spring inwardly in a manner which will presently become apparent. The prongs 7 cooperate with the lower wall 17 of groove 16 in the plug to grip the same and urge the same axially toward the socket. A safety device in the form of a cylindrical locking tube 18 having an internal annular groove 22 near the lower portion thereof is provided to be slipped over the finger portions of the snap-action-gripping device when the plug and socket are assembled to lock the same together and prevent the uncoupling of the same unless the said tube 18 is withdrawn from engagement with the said finger portions 6. Outwardly directed protrusions 9 are provided on the fingers to frictionally engage the annular groove 22 of the locking tube to prevent the accidental displacement of the same.

The snap-action-gripping element will now be described in detail. Referring to the drawing, particularly Figures 1, 2 and 3, I have shown the gripping element generally at 4, as being of circular shape and having a base 5 in the form of a dished annular ring of resilient material and having on a periphery thereof struck-up fingers 6, having a root portion integral with the portion of the ring from which struck, and extending in a direction generally normal to the surface of the portion from which struck. Each of the fingers has a prong 7 struck thereon extending approximately normal thereto and inwardly, that is to say, toward the axis of the ring. Collinear with the base I provide inwardly extending portions 8 or outwardly extending portions 8' for a purpose later to become apparent.

The base portion 5, which is the dished annular ring, has two conditions of stability which are convex alternately to opposed sides of a plane passing through the periphery of the ring. An equivalent statement is that if the ring is supported in the plane of its outer periphery one condition of stability is that wherein the inner periphery has a position displaced axially in one direction from said plane; and the second position of stability is that wherein the inner periphery is displaced axially on the opposite side of said plane. One way in which I obtain this effect is by permanently stretching the resilient metal on and adjacent the inner periphery of the ring so that the ring assumes a dished shape. I can, however, make the base member from a strip of metal formed to the shape of a dished ring with ends butting or lapping, and connected together as by welding, brazing, soldering, or the like.

I find a simple and economical way to fabricate my snap-action-gripping element is to first punch out of a flat sheet a flat open-center disc having an outer size and shape of the desired outer size and shape of the snap-action-gripping element. Then I scribe an outline of the desired finger and prong portions which are spaced apart, and in the intervening spaces, the inwardly extending portions 8. I then punch out the unwanted material, strike up the fingers at the inner periphery of the base portion and strike inwardly directed prongs on the fingers. The inner periphery of the base is stretched by the punching operation to give the dished shape, though I find peening, pressing or rolling desirable in some cases to accentuate the convexity. It is noted that the protrusions 9 on the fingers may be formed in a separate step or simultaneously with the striking out of the unwanted metal by simply dimpling the material from the back or under side.

It will also be noted that the slits or cut-out portions between the fingers 6 and the inwardly struck base extensions 8 terminate in curves in order to relieve concentrated stresses to prevent the formation of fatigue cracks in the base portion 5, due to repeated flexing.

I have found it desirable in some applications to so construct the snap element that a much greater force is required for disengagement of the coupling elements in which it is used than is required for engagement. In accordance with this purpose, I provide a modified form of snap-action element as shown in Fig. 4.

In this embodiment, the upstruck prongs are struck up on the outer periphery of the snap ring base portion and collinear base portions 8 project radially outwardly beyond the up-struck prongs to the outer periphery of the snap ring.

It is apparent that the moment arm causing the snap ring to close as a consequence of pressure applied adjacent the inner periphery of the ring is approximately the width of the base portion 5 plus the length of the outwardly extending co-extensive base sections 8; whereas the moment arm available for opening the gripping device is approximately only the distance between the fingers and the outer periphery, i. e., the length of the outwardly extending coextensive base sections 8.

It follows, since the total moment required to open the snap-action-gripping element is to all intents and purposes equivalent to the total moment required to close the same, that the force required to open the snap-action ring compared to that necessary to close the snap-action ring, bears an inverse ratio to the lengths of the moment arms.

For example, if the co-extensive base extensions are equal in length to the width of the base of the snap-action-gripping element, then twice the force is necessary to open the gripping element as to close it.

While I have described the snap-action-gripping device as generally circular, it is obvious that it may have any desirable shape to cooperate with the shape of any desirable plug and socket.

It is now apparent that when the dished ring is upwardly convex, the root of the fingers and the base inward extensions are above the outer periphery of the ring, that the fingers now incline outwardly and that the space circumscribed by the inturned prongs is increased by the outward inclination of the fingers.

If pressure is exerted axially downwardly on the inward extensions 8 of the base 5, of the device of Fig. 3, or on the inner periphery of the base of Fig. 4, the same will resist the motion until a position of dead center is reached, at which point the dished ring 5 will snap into its downwardly convex position as shown in Fig. 2, and the fingers, and therefore the prongs, move axially downward a distance substantially equal to the axial motion of that portion of the ring to which attacked, and the fingers, and therefore the prongs, circumscribe a decreased space by virtue of the inward inclination of the fingers. There is thus obtained two desirable effects which are, axial motion toward the snap ring, and inward gripping of the prongs.

Figure 1 shows one application of the snap-action-gripping device to a coupler for flexible hoses, electrical conduits and the like. In the socket part shown generally at 2, I provide an internal groove 13 in which I seat the outer periphery of the snap-action device 4. The walls of the socket converge to the desired cross section and I find it desirable to provide an internal shoulder 19 upon which I seat the end 20 of plug member 1.

The plug member 1 has an end section of a size and shape to telescope into the socket. The extension section terminates at an outwardly extending shoulder 15. This shoulder forms the lower surface of an outwardly extending peripheral portion the upper surface of which forms the lower wall or shoulder 17 of groove 16. The length of the outwardly extending peripheral portion is slightly less than the length of the finger portions of the snap-action-gripping device. The outside dimension of the outwardly extending peripheral portion is such as to freely pass into the space circumscribed by the prongs when the snap action gripping device is in upwardly convex or open condition, such as shown in Fig. 1. The lower shoulder 15 of this portion passes freely into the socket until it abuts the inwardly extending disc base portions. Further urging of the plug toward the socket causes the snap ring to flatten until the condition of dead center is reached. At that point the fingers have moved inwardly and the prongs partially engage the lower wall or shoulder 17 of groove 16. Any further movement permits the snap-action device to snap the plug downward into the socket, and to urge the fingers and therefore the prongs forcibly inward.

To prevent any possibility of the snap-action ring becoming closed without the insertion of a plug to the proper extent, to provide ease in the insertion of the plug coupling member and to prevent the accidental separation of the plug and socket as by a jerk or pull on either member, I provide the peripheral locking member or shell 18, which is free to telescope on the outside wall of the plug member 1. The locking member has an internal annular groove 22 to frictionally cooperate with the outwardly extending protrusions on the fingers to prevent its accidental displacement from locking position. It will be seen by reference to Fig. 2, that the plug and socket cannot be separated until locking member 18 is slidably disengaged from fingers 6 of the snap action element 4.

At the lower end of the sleeve element 18, I provide an external chamfer or groove 23, as shown in Figs. 1 and 2, beyond which the inturned prongs of fingers 6 in the open condition repose, whereby the accidental closing of the same by external pressure on the sleeve or by the end of the plug striking the same is prevented.

Having thus described my invention, what I claim is:

1. In combination, a plug and a socket, and a snap action gripping device, said socket having an interior surface defining a hollow space, and having an annular groove in the inner surface thereof in a plane normal to the longitudinal axis thereof, said snap action gripping device having a continuous base portion having an open center defined by an inner periphery; and said continuous base portion having an outer peripheral portion adapted to seat in said groove, fingers substantially normal to said base portion and integral therewith intermediate the inner periphery and the outer peripheral portion and having inwardly directed prongs on the free ends thereof; said plug having an extension portion adapted to pass through the open center of said snap action gripping device and terminating at the inner end in a shoulder portion, said shoulder being adapted to pass through said prongs when open and to abut the inner peripheral base portion; a groove in such plug member axially spaced from said shoulder a distance equal substantially to the length of said fingers, whereby axial motion of said plug toward the socket causes axial motion of said inner peripheral base portion thereby causing said fingers to move inwardly and said prongs to engage said groove.

2. The device of claim 1, including a sleeve member slidably supported in said socket and having an externally chamfered end whereby said chamfered end abuts said inturned prongs when in the open condition to prevent the unintentional closing thereof.

3. The device of claim 2, wherein said sleeve member is provided with an internal annular recess opening at the chamfered end whereby it is adapted to be slidably engaged externally with said finger portions when said plug and said socket are engaged.

4. The device of claim 3, wherein said fingers have outwardly projecting protuberances intermediate the length thereof, and said sleeve has a groove on the internal surface thereof in the annular recess portion to frictionally lock said sleeve in engaged condition with said fingers and to prevent the accidental disengagement thereof.

5. The device of claim 4, wherein said socket interior surface defines a hollow bore below said groove slightly larger than said plug extension portion to provide a guide therefor.

6. In combination a pair of coupling members, and a snap action gripping device, a first of said coupling members being hollow and having a groove in the inner surface thereof lying in a plane normal to the longitudinal axis thereof, said snap action gripping device having a continuous open center base portion conforming in external shape to the internal shape of said first coupling member, and having an outer peripheral base portion adapted to seat in said groove; fingers integral with said base portion and substantially normal thereto having inwardly directed prongs on the free ends thereof, said fingers having outwardly directed protrusions thereon; and the second of said coupling members adapted to slidably fit in the first coupling member and having an elongated end portion, a peripheral collar portion terminating the inner end portion and being of a length substantially equal to the length of the fingers, said snap action device base portion being of resilient material and having a dished shape whereby a condition of stability is obtained when convex upward, and a second condition of stability is obtained when convex downward, whereby when said base portion is convex upward, said second coupling member collar portion is adapted to pass freely within the confines of said prong portions until the shoulder forming the lower termination thereof rests against the inner peripheral portion of said base portion, and under the influence of pressure exerted by the aforesaid shoulder, said snap action gripping device base portion is caused to snap from upward convex condition to a downward convex condition, whereby said inwardly directed prongs are caused to spring inwardly over the upper shoulder of the collar portion and axially toward the first coupling member.

7. The device of claim 6, including a sleeve member slidably supported on the internal surface of said first coupling member and having an internal groove intermediate the ends thereof and spaced from the lower end by a distance not exceeding the distance between said snap action base portion and finger protrusions whereby the same is adapted to be telescoped over the said finger portions when in gripping condition and said groove frictionally engages said protrusions on said fingers to lock the same against opening.

8. The device of claim 7, wherein said first coupling member has an internal surface below said groove defining a hollow space below the said groove of a size to accommodate the said second coupling member extension portion and serve as a guide therefor.

9. A snap action gripping device comprising an open center resilient dished base having an inner periphery and an outer periphery, finger portions affixed intermediate said inner periphery and said outer periphery and inwardly struck prongs on the free ends of said fingers.

10. A snap action gripping element comprising a base portion, base extension portions, finger portions and prong portions, said base portion being a strip of resilient material enclosing an area, and being at all points substantially equally inclined to a plane passing through all points of the outer periphery of said strip, said base extension portions being integral with the base portion and extending outwardly substantially coplanarly with the base portion, said finger portions being portions affixed substantially normally to the respective base portions and having roots integral therewith between the said extension portions; and prong portions inwardly directed substantially normal to said finger portions.

FOSTER J. TRAINOR.

REFERENCES CITED

The following references are of record in the file of this patent:

UNITED STATES PATENTS

| Number | Name | Date |
| --- | --- | --- |
| 1,192,404 | Ewart | July 25, 1916 |
| 1,390,266 | Armstrong | Sept. 13, 1921 |
| 2,034,051 | Lipp | Mar. 17, 1936 |